(12) United States Patent
Woloszyn et al.

(10) Patent No.: US 11,125,287 B2
(45) Date of Patent: Sep. 21, 2021

(54) DEVICE FOR ADJUSTING THE CLEARANCE OF A DRUM BRAKE

(71) Applicant: FRENI BREMBO S.P.A., Bergamo (IT)

(72) Inventors: Tomasz Woloszyn, Curno (IT); Alessandro Galassi, Curno (IT); Nicolo Mazzarini, Curno (IT); Italo Pirovano, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 47 days.

(21) Appl. No.: 16/471,694

(22) PCT Filed: Dec. 15, 2017

(86) PCT No.: PCT/IB2017/057986
§ 371 (c)(1),
(2) Date: Jun. 20, 2019

(87) PCT Pub. No.: WO2018/116095
PCT Pub. Date: Jun. 28, 2018

(65) Prior Publication Data
US 2019/0316643 A1    Oct. 17, 2019

(30) Foreign Application Priority Data
Dec. 20, 2016 (IT) .................. 102016000128706

(51) Int. Cl.
*F16D 63/00* (2006.01)
*F16D 65/56* (2006.01)
*F16D 121/14* (2012.01)

(52) U.S. Cl.
CPC ......... *F16D 63/004* (2013.01); *F16D 65/565* (2013.01); *F16D 2121/14* (2013.01)

(58) Field of Classification Search
CPC ...... F16D 65/561; F16D 65/565; F16D 65/22; F16D 2121/14; F16D 63/004
See application file for complete search history.

(56) References Cited

U.S. PATENT DOCUMENTS

| | | | |
|---|---|---|---|
| 3,010,544 A | 11/1961 | Dahle et al. | |
| 4,220,227 A * | 9/1980 | Kluger | ............... F16D 65/563 |
| | | | 188/196 BA |
| 4,502,574 A | 3/1985 | Spaargaren | |
| 5,180,037 A | 1/1993 | Evans | |
| 5,480,010 A | 1/1996 | Johannesen | |
| 6,328,141 B1 * | 12/2001 | Asai | .................... F16D 51/20 |
| | | | 188/196 BA |

(Continued)

FOREIGN PATENT DOCUMENTS

| DE | 102014204769 A1 | 6/2015 |
|---|---|---|
| GB | 1191115 A | 5/1970 |

OTHER PUBLICATIONS

European Patent Office, International Search Report and Written Opinion in Application No. PCT/IB2017/057986, dated Nov. 4, 2018, 10 pages, Rijswijk, Netherlands.

*Primary Examiner* — Vishal R Sahni
(74) *Attorney, Agent, or Firm* — Marshall & Melhorn, LLC

(57) ABSTRACT

A device for adjusting the clearance of a drum brake capable of avoiding the canceling of the minimum operating clearance also in case of repeated brakes without the wear of the shoes, and arranged between two shoes which cooperate with a braking surface of a drum.

17 Claims, 13 Drawing Sheets

(56) References Cited

U.S. PATENT DOCUMENTS

| | | |
|---|---|---|
| 6,394,237 B1 | 5/2002 | Asai |
| 6,568,513 B1 | 5/2003 | Doolittle et al. |
| 7,011,194 B1 | 3/2006 | Doolittle et al. |
| 7,178,642 B1 | 2/2007 | Chamat |
| 7,270,220 B1 | 9/2007 | Chamat |
| 7,472,776 B2 | 1/2009 | Chamat |
| 2002/0117364 A1* | 8/2002 | Ikeda .................. F16D 65/091 188/79.51 |
| 2011/0100772 A1 | 5/2011 | Narayanan et al. |

* cited by examiner

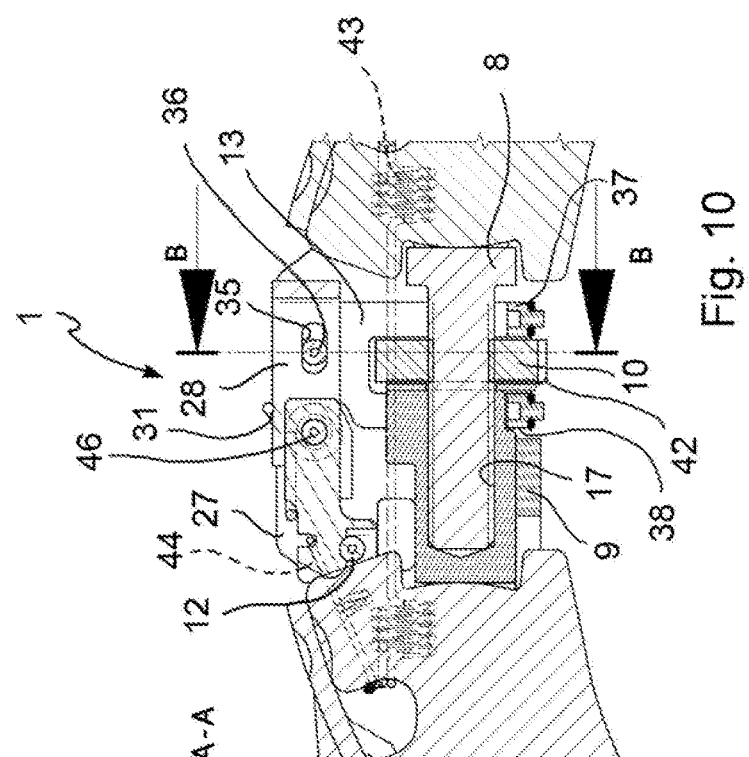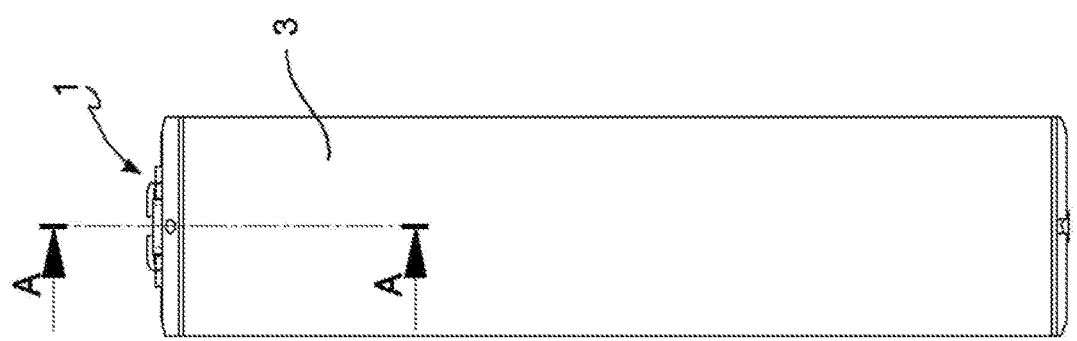

DEVICE FOR ADJUSTING THE CLEARANCE OF A DRUM BRAKE

FIELD OF THE INVENTION

It is the object of the present invention a device for adjusting the clearance of a parking brake. In particular, the present invention relates to a brake of the drum-in-hat type, even more in particular to a parking brake of the drum-in-hat type.

BACKGROUND ART

As known, parking brakes of the drum-in-hat type are widely used in vehicles because of the possibility they offer to reduce construction complexity, and, in particular, the components of a parking brake.

For example, document U.S. Pat. No. 5,180,037 shows a known solution for a parking brake of the drum-in-hat type.

These types of brake show a very limited wear of the friction material of the shoes. In fact, parking brakes are usually used to keep the vehicle stationary, for example, parked. However, safety standards require that the parking brake may function as an emergency brake, which results in the sizing thereof and in an operating safety thereof, adapted to slow down and stop a vehicle in predetermined driving conditions.

Solutions of this type are known, for example, from DE 102014204769 A1 and from US 2011/0100772 A1.

The solutions shown in U.S. Pat. Nos. 4,220,227 and 4,502,574 disclose a device for adjusting the clearance of a drum brake, which however is of the service type and not of the parking type, which allows to adjust the extension of a strut defining the distance between a friction surface of brake jaws, or shoes, and a braking surface of a drum. In particular, this adjusting mechanism comprises a pawl which, upon the movement of a shoe towards the drum, causes the rotation of a star wheel, in particular, when the wear of the shoe pads occurs. In detail, at the end of the application of the braking action, the pawl engages the tooth of the star wheel causing the extension of the strut. This mechanism allows an adequate adjustment for most service braking operations, however, if the drum brake operates in extreme conditions, in particular, when a high braking force is applied, the shoe is pressed onto the friction surface, to the point that it is possible that the pawl may move along a number of teeth on the star wheel. Once the pawl returns to the resting position thereof, the star wheel crosses an arc corresponding to a number of teeth, canceling also the minimum operating clearance required between shoes and drum and preventing a free rotation of the drum even in the absence of a braking action.

Therefore, the need is strongly felt to realize a device for adjusting the clearance between shoes and drum, which, below a threshold braking action, makes the adjustment of the strut possible by moving away the shoes, therefore adjusting the clearance between these and the drum braking surface, although, above this threshold braking action it instead prevents the rotation, so as not to continue to move the shoes away from one another, also canceling a minimum operating clearance between shoes and drum.

U.S. Pat. No. 7,011,194 describes a structure which comprises a yielding member which yields to limit the effect of an operating force on the expandable strut such that, during a single application of the brake, it exceeds a maximum adjustment and therefore guarantees the preservation of a minimum operating distance between shoes and drum braking surface.

Similar solutions are known from U.S. Pat. No. 7,472,776 of Robert Bosch GmbH and from U.S. Pat. No. 6,394,237 of Nisshinbo Industries, Inc.

Other solutions are known from U.S. Pat. Nos. 7,178,642, 7,011,194, 5,480,010, 7,270,220, 6,568,513, 4,502,574, 7,011,194.

However, all these known solutions are adapted to service brakes which, at each braking action, obtain a slight wear of the shoes and therefore slightly approach the shoes to the drum to substantially ensure a constant clearance between the shoes and the drum itself in the presence of a continuous wear of the shoes and of the drum.

Conversely, the need is strongly felt for solutions which allow to avoid continuously adjusting the distance between the shoes at each application of the brake, when this is of the parking type, and therefore a brake that does not always, but rarely wears during the operation thereof and many times operates with the vehicle stationary without substantially wearing neither the shoes nor the drum.

The need is therefore felt to provide a device for adjusting the clearance of a brake, in particular a parking brake of the drum-in-hat type, which allows to solve the problems of the background art solutions and in particular allows to obtain a minimum operating clearance between the shoes and the drum, also following repeated actuations which do not involve the wear of the shoes.

Furthermore, the need is felt to provide a brake actuation assembly that is simple to manufacture.

Furthermore, the need is felt to provide a brake actuation assembly having a small number of components.

The need to reduce the overall bulkiness of the brake actuation assembly is also felt.

Solution

It is an object of the present invention to obviate the drawbacks of the background art and to offer a solution to the need of providing an assembly as defined in the attached claims.

By virtue of a device for adjusting the clearance of a drum brake arranged between two shoes which cooperate with a braking surface of a drum, in which said shoes are moved by an actuation device which stresses them from a resting position, and in which the shoes are away from said braking surface, ensuring at least a minimum operating clearance, to a braking position, in which the shoes abut against said braking surface, in which said clearance adjustment device comprises an extensible strut assembly arranged between the shoes, which creates a reaction action on the shoes when stressed by a braking action applied by the actuation device, and in which said extensible strut assembly comprises a piston rotationally constrained to a first shoe and a support rotationally constrained to a second shoe and slidingly connected to said piston making the strut extensible to adjust the distance of said first and second shoe, as well as a toothed ring rotational with respect to said piston and abutting against said support, by rotating said toothed ring applies an action on said piston and on said support thus extending said strut and moving away said shoes, and in which said clearance adjustment device further comprises a lever assembly having a first lever end arranged in contact with one of said shoes and biased in rotation by said shoe when said shoe is stressed by said actuation device, said lever assembly rotating about a lever pin, and in which said clearance adjustment device further comprises a sliding guide associated with said lever assembly with at least one sliding guiding portion thereof inserting into the extensible strut assembly, said sliding guide slides with respect to said extensible strut assembly during the rotation of said lever assembly, and in which said sliding guide comprises a ratchet mechanism which acts on said toothed ring so as to turn said toothed ring when said sliding guide slides with respect to said extensible strut assembly and when it exceeds a predetermined idle stroke thereof of said ratchet mechanism with respect to said toothed ring, in which said coupling of said sliding guide and said extensible strut assembly makes the sliding of said sliding guide possible when the reaction action (Fr), equal and contrary to the braking action (Ff), is lower than a predetermined threshold (Fs), thus allowing the ratchet mechanism to run said idle stroke and possibly actuate said toothed ring extending said extensible strut assembly, and in which said coupling of said sliding guide and said extensible strut assembly prevents the sliding of said sliding guide when the reaction action (Fr), equal and contrary to the braking action (Ff), is higher than a predetermined threshold (Fs), thus allowing the ratchet mechanism, before reaching said threshold (Fs), to run said idle stroke, but, once reached said threshold (Fs), preventing the actuation of said toothed ring, thus preventing the extension of said extensible strut assembly, it is possible to satisfy the above mentioned needs and, in particular, it allows to obtain a minimum operating clearance between the shoes and the drum even after repeated actuations which do not entail the wear of the shoes.

Some advantageous embodiments are object of the dependent claims.

FIGURES

Further features and advantages of the assembly according to the invention will become apparent from the following description of preferred embodiments, given by way of indicative and non-limiting example, with reference to the accompanying figures, in which:

FIG. 9 shows an assembly of shoes and clearance adjustment device, according to FIG. 8, in side or radial view;

FIG. 10 shows a section, according to the plane A-A of FIG. 9, of the assembly of FIG. 9;

DESCRIPTION OF SOME PREFERRED EMBODIMENTS

Figure 1:
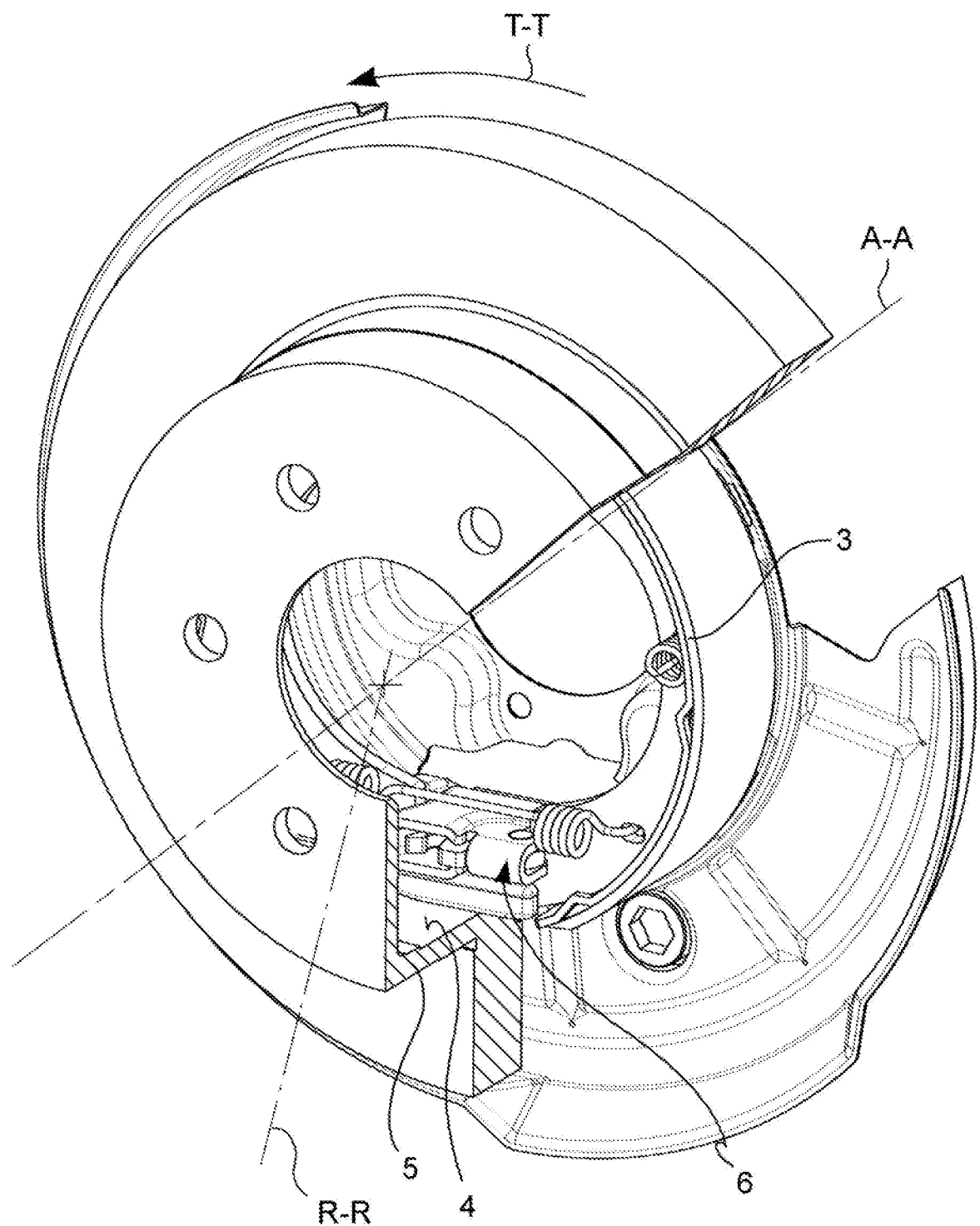
FIG. 1 shows, in a partially sectioned axonometric view, an assembly of a disc of a disc brake and parking brake of the drum-in-hat type, comprising a brake actuation assembly and a separate device for adjusting the clearance of a drum brake.
Figure 2:
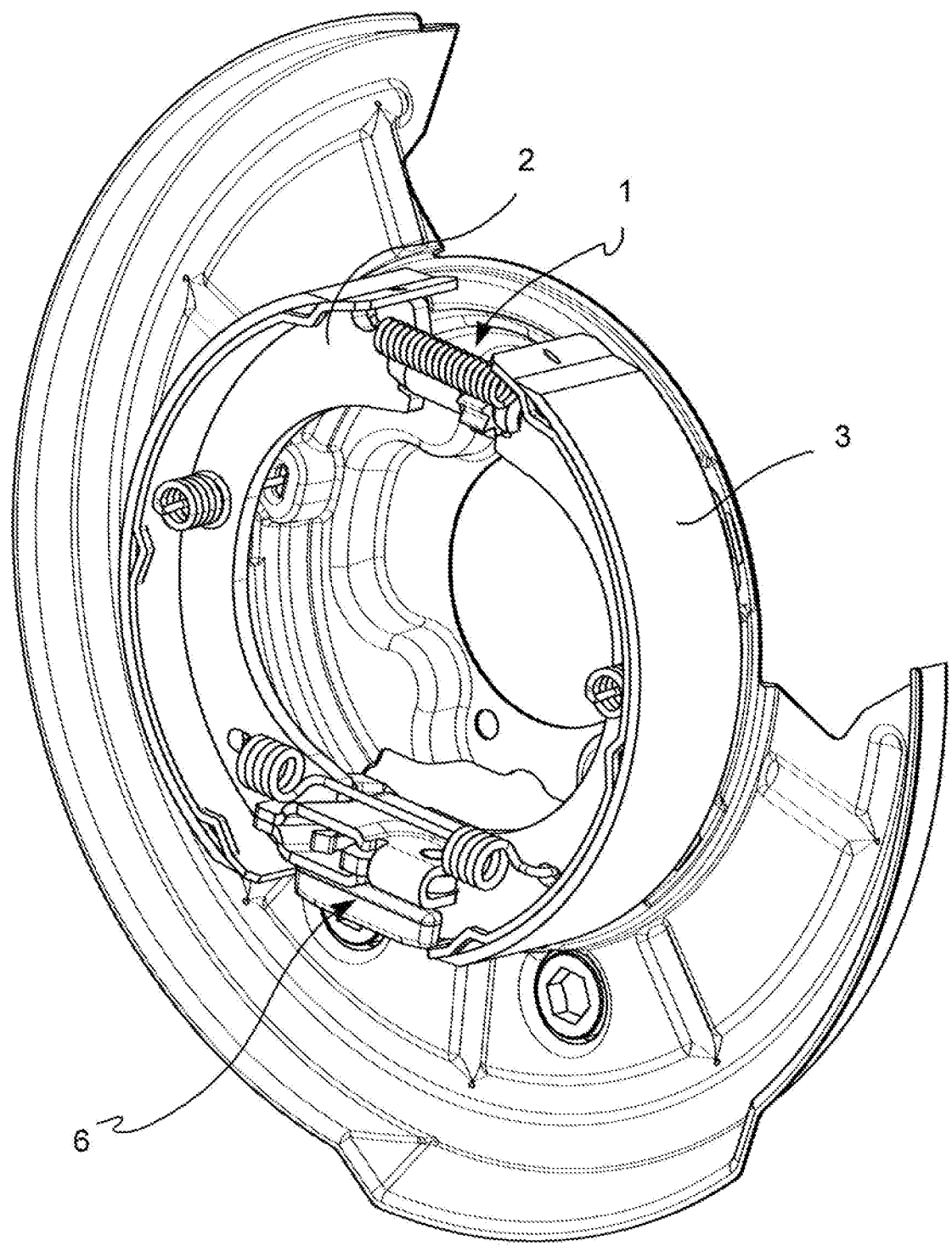
FIG. 2 shows, in an axonometric view, the brake of FIG. 1 in which the disc of the disc brake was removed to highlight the parking brake.
Figure 3:
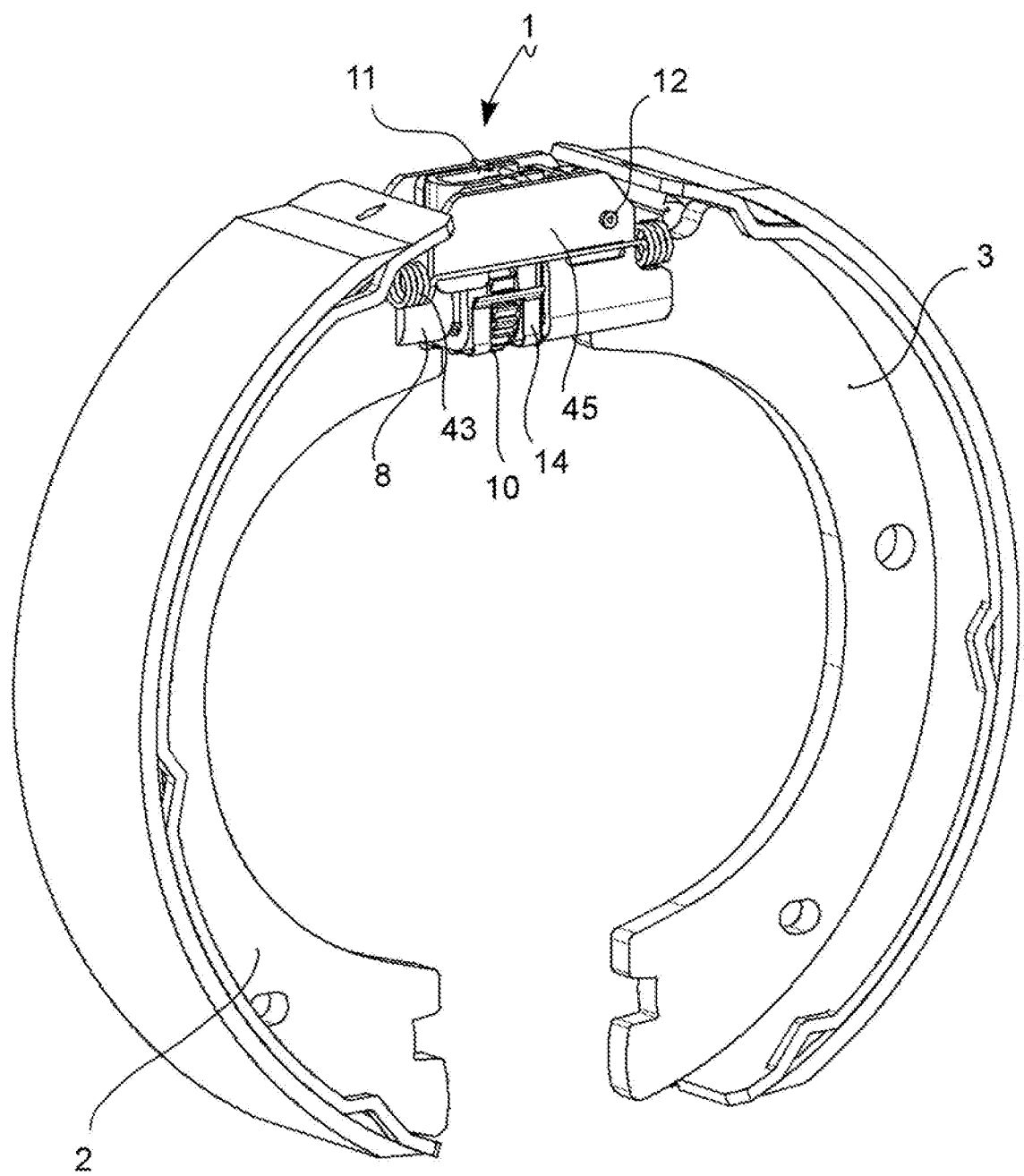
FIG. 3 shows in an axonometric view a couple of shoes with associated a device for adjusting the clearance between the shoes and the drum or the bell of the brake disc.
Figure 4:
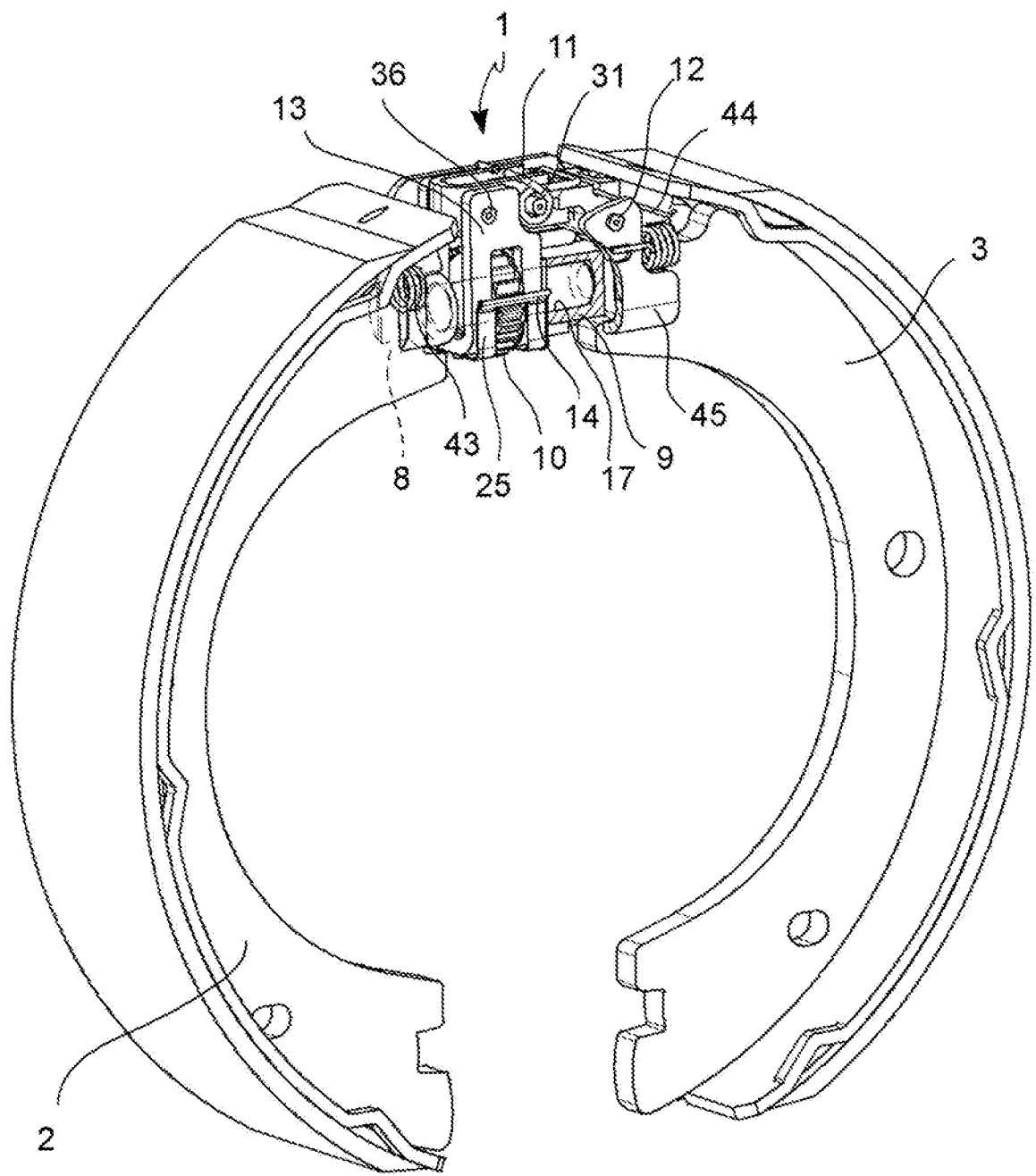
FIG. 4 shows in an axonometric view in sectioned parts, the assembly of FIG. 3 in which the containing body and the extensible strut assembly of the device are partially sectioned or in transparency to show the details of the device itself.
Figure 5:
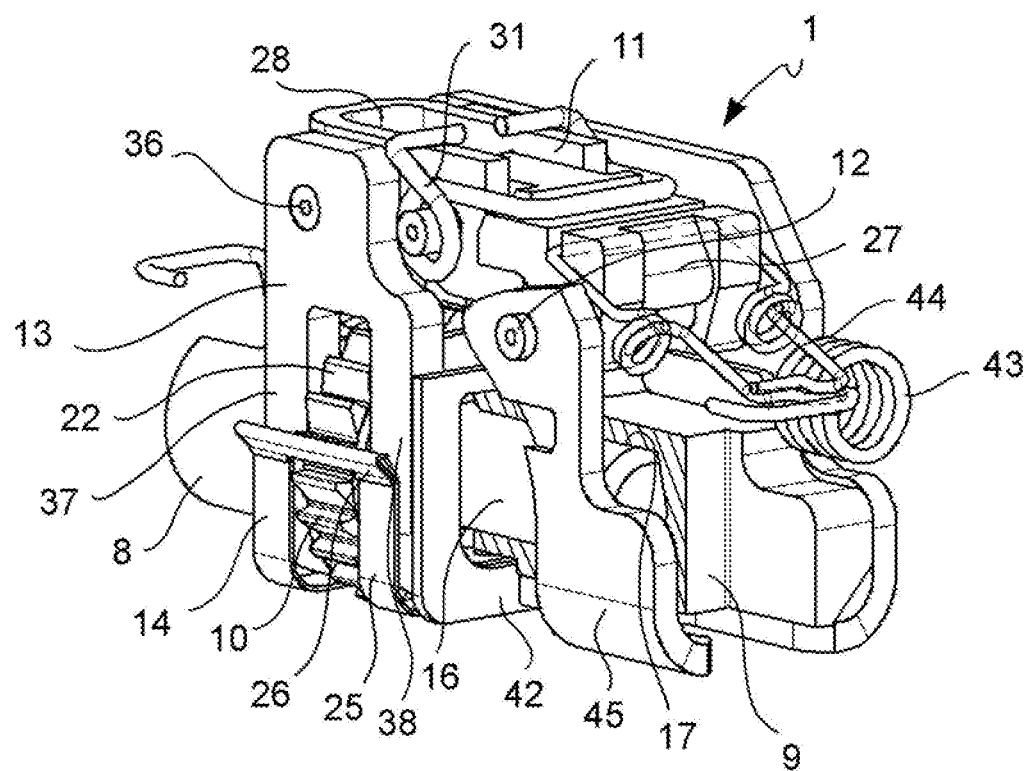
FIG. 5 and FIG. 6 show in an axonometric view in sectioned parts the clearance adjustment device of FIG. 4.
Figure 6:
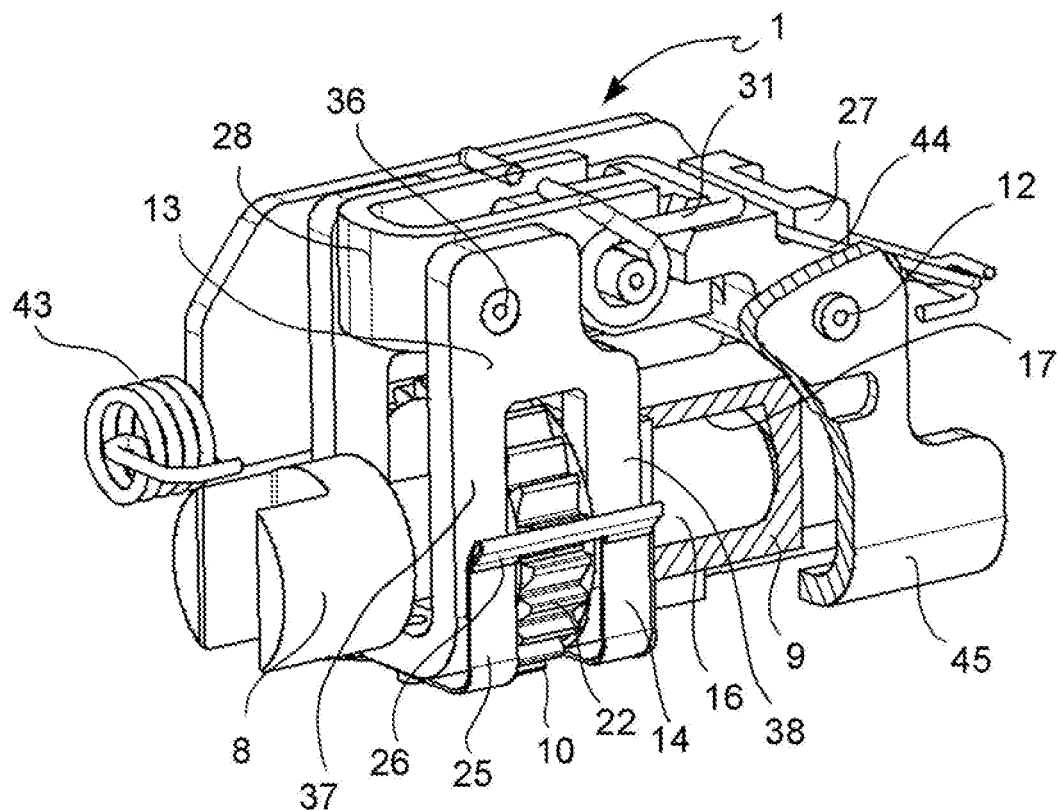
Figure 7:
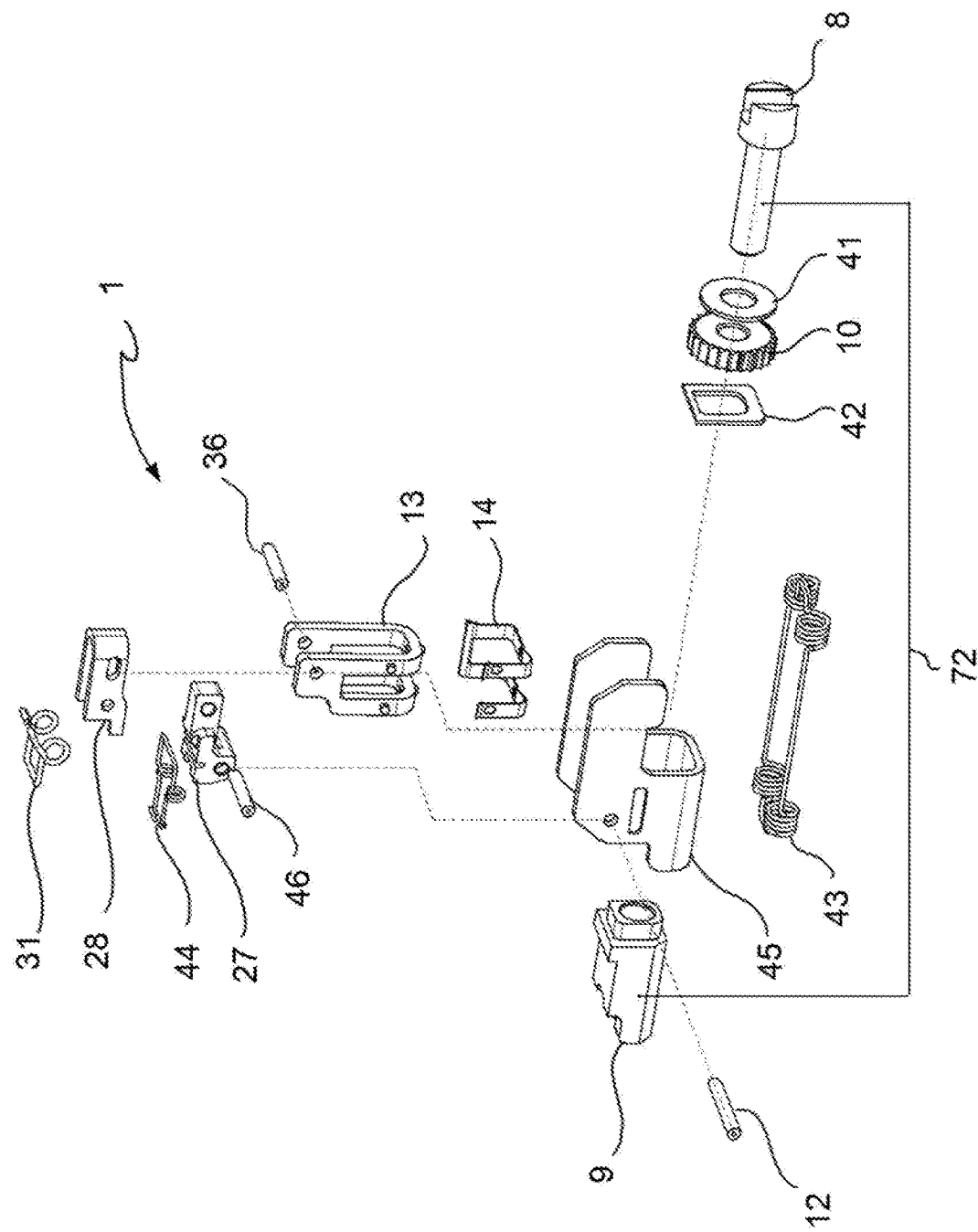
FIG. 7 shows in an axonometric view and in separate parts, the device of FIG. 6.
Figure 8:
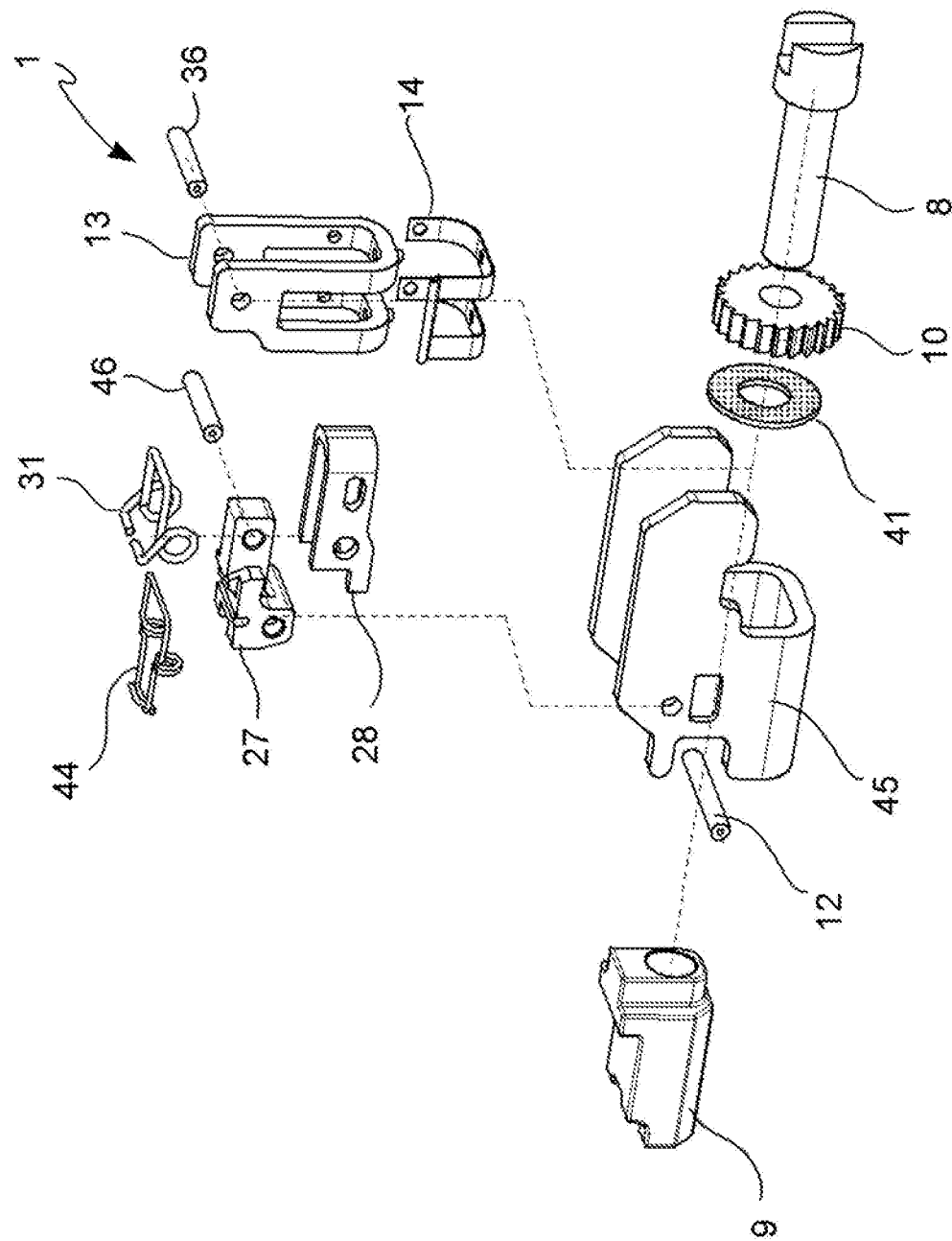
FIG. 8 shows in an axonometric view and in separate parts, a clearance adjustment device according to a further embodiment.
Figure 11:
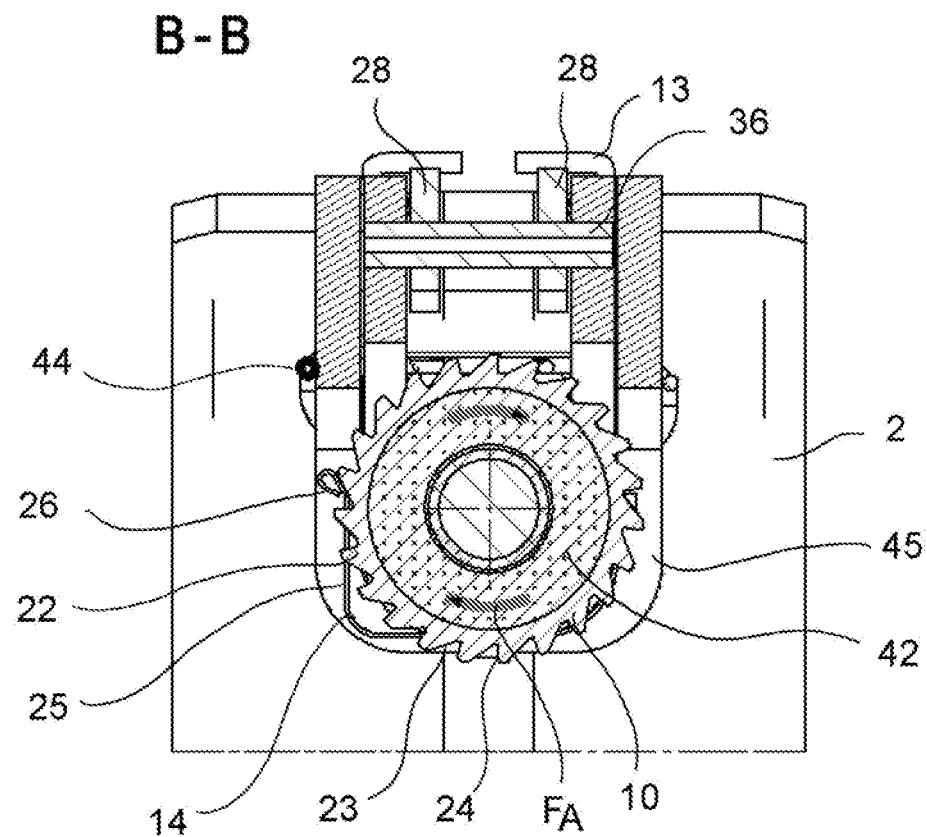
FIG. 11 shows a section, according to the plane B-B of FIG. 10, of the assembly of FIG. 10.
Figure 12:
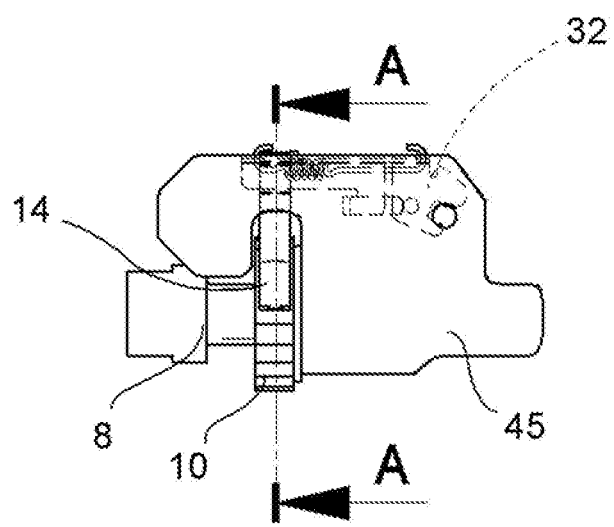
FIG. 12 shows in front or axial view a clearance adjustment device according to a further embodiment.
Figure 13:
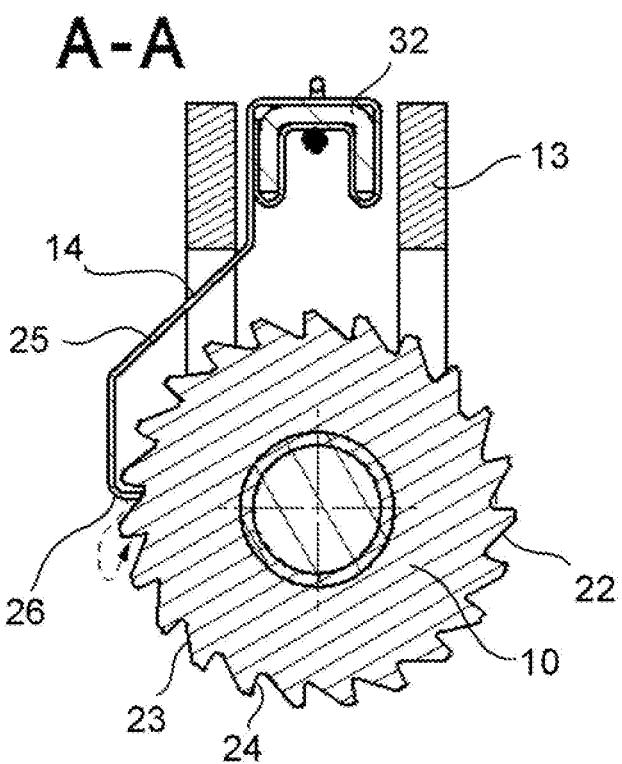
FIG. 13 shows a section, according to the plane A-A of FIG. 12, of the assembly of FIG. 12.
Figure 14:
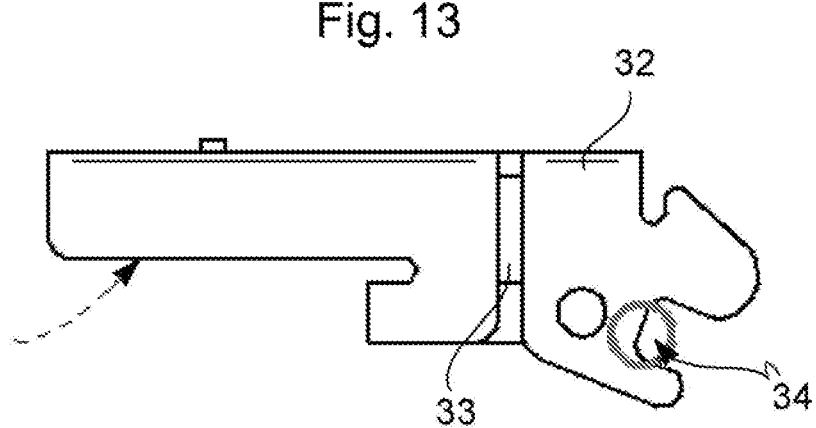
FIG. 14 and FIG. 15 show a detail, in front or axial view and in top or radial view, of the lever assembly of the device of FIG. 12.
Figure 15:
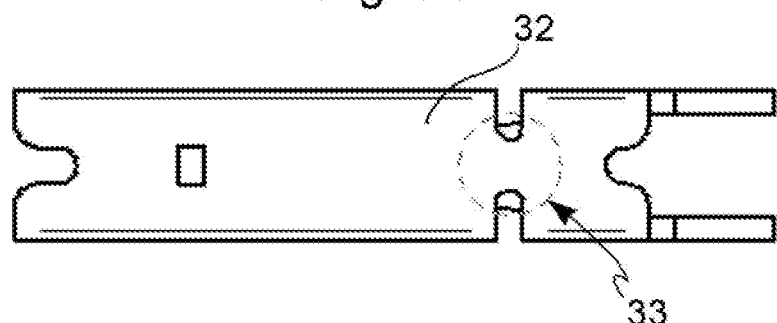

Hereinafter, "longitudinal direction" means a direction (T-T) parallel to the direction of the brake actuation assembly action. "Axial direction" means a direction (A-A) parallel to the rotation axis of the brake disc. "Rotation direction", hereinafter indicated with S, means a circular direction or with limited rotation or oscillation of the lever for applying the parking brake clearance adjustment action. "Braking force" means the force applied by the shoes on the clearance adjustment device.

With reference to the Figures and in accordance with a general embodiment, a device for adjusting the clearance of a drum brake (1) is arranged between two shoes (2, 3) which cooperate with a braking surface (4) of a drum (5).

Said shoes (2, 3) are moved by an actuation device (6) which stresses them from a resting position, in which the shoes (2, 3) are away from said braking surface (4) at least by a minimum operating clearance, to a braking position, in which the shoes (2, 3) abut against said braking surface (4).

Said clearance adjustment device (1) comprises an extensible strut assembly (7) arranged between the shoes (2, 3), which creates a reaction action on the shoes (2, 3) when stressed by a braking action applied by the actuation device (6).

Said extensible strut assembly (7) comprises a piston (8) rotationally constrained to a first shoe (2).

Said extensible strut assembly (7) further comprises support (9) rotationally constrained to a second shoe (3) and slidingly connected to said piston (8), making the strut (7) extensible and allowing it to adjust the distance of said first and second shoe (2, 3).

Said device further comprises a toothed ring (10) rotational with respect to said piston (8) and abutting against said support (9).

Said toothed ring (10), when rotating, applies an action on said piston (8) and on said support (9) thus extending said strut (7) and moving away said shoes (2, 3) therebetween, so as adjust the clearance between the shoes and the braking surface of the drum.

Said clearance adjustment device (1) further comprises a lever assembly (11).

Said lever assembly comprises a first lever end arranged in contact with one of said shoes (3) to be biased in rotation by said shoe (3) when said shoe (3) is stressed by said actuation device (6).

Said lever assembly (11) rotates about a lever pin (12), when stressed by the rotation of the shoe 3.

Said clearance adjustment device (1) further comprises a sliding guide (13) associated with said lever assembly (11) with at least one sliding guiding portion (13) thereof inserted in the extensible strut assembly (7).

Said sliding guide (13) slides, for example, although not necessarily, transversely to said extensible strut assembly (7) during the rotation of said lever assembly (11).

Said sliding guide (13) comprises a ratchet mechanism (14) which acts on said toothed ring (10) so as to turn said toothed ring (10) when said sliding guide (13) slides with respect to said extensible strut assembly (7) and when it exceeds a predetermined idle stroke (15) thereof of said ratchet mechanism (14) with respect to said toothed ring (10).

Said coupling of said sliding guide (13) and said extensible strut assembly (7) makes the sliding of said sliding guide (13) possible when the reaction action (Fr), equal and contrary to the braking action (Ff), here meaning the action applied by the shoes on the extensible strut assembly, is lower than a predetermined threshold (Fs), thus allowing the ratchet mechanism (14) to run said idle stroke (15) and possibly actuate said toothed ring (10) extending said extensible strut assembly.

Conversely, said coupling of said sliding guide (13) and said extensible strut assembly (7) prevents the sliding of said sliding guide (13) when the reaction action (Fr), equal and contrary to the braking action (Ff), is higher than the predetermined threshold (Fs), thus preventing the ratchet mechanism (14), when said threshold (Fs) is reached, from actuating said toothed ring (10) and preventing the extension of said extensible strut assembly (7).

In accordance with a further embodiment, said extensible strut assembly (7) comprises a piston (8) having an externally threaded piston stem (16).

Said support (9) comprises a support housing (17) which slidingly accommodates said piston stem (16).

In accordance with a further embodiment, said support comprises a support abutting surface (18).

In accordance with a further embodiment, said toothed ring (10) comprises a ring body (19) having a threaded hole (20) screwed to said threaded piston stem (16).

In accordance with a further embodiment, said threaded ring (10) comprises a ring abutting surface (21) adapted to cooperate, either directly or indirectly, with said support abutting surface (18).

In accordance with a further embodiment, said ratchet mechanism (14) is a one-way ratchet mechanism which cooperates with the toothed ring (10) comprising ring teeth (22) shaped with a slide-shaped tooth side (23), which allows the ratchet mechanism (14) to climb over the tooth (22) on which the ratchet mechanism (14) acts, without rotating said toothed ring, and with a coupling tooth side (24), which makes the coupling of the ratchet mechanism (14) and the rotation of the toothed ring (10) possible.

In accordance with a further embodiment, said ratchet mechanism (14) comprises an elastic clip body (25).

Said body (25) is connected to said sliding guide (13) so as to allow one ratchet-shaped clip end (26) to couple with a tooth (22) of said toothed ring (10), in the movement thereof when it must rotate said ring nut (10), and climb over said tooth (22) being elastically deformed, when performing a movement opposite to the previous one.

In accordance with a further embodiment, said body (25) is connected to said lever assembly (11).

In accordance with a further embodiment, said lever assembly (11) comprises a first bar (27) rotationally connected to said lever pin (12).

In accordance with a further embodiment, said lever assembly (11) comprises a second bar (28) rotationally connected with respect to said first bar (27).

In accordance with a further embodiment, said first bar (27) comprises a first bar abutting surface (29) and said second bar (28) comprises a second bar abutting surface (30).

Said lever assembly (11) comprises elastic lever elements (31) which constantly bias said first bar abutting surface (29) to abut against said second bar abutting surface (30) taking, when it is not stressed, since the sliding of the sliding guide (13) is prevented, said lever assembly (11) to a resting position and returning said lever assembly to this resting position at least when the braking action (Ff) ceases.

"Resting position" means a position, in this embodiment, in which the abutting surface (29) of said first bar (27) abuts against said abutting surface (30) of said second bar (28).

"Resting position" also means the position of the lever assembly when the shoes do not stress the clearance adjustment device (1).

Said elastic lever elements (31) allow the relative rotation of said second bar (28) with respect to said first bar (27), at least when the braking action (Ff) is higher than said predetermined threshold (Fs), and the sliding of said sliding guide (13) is avoided.

In accordance with a further embodiment, said lever assembly (11) comprises a single lever bar (32).

Said single lever bar (32) comprises an elastic lever portion (33) which allows the bending of the lever assembly when the braking force (Ff) is greater than said predetermined threshold (Fs), and prevents the sliding of the sliding guide (13) by blocking it.

In accordance with a further embodiment, a torsional return spring (34) is provided between said lever assembly (11) and said single lever bar (32).

In accordance with a further embodiment, said sliding guide (13) is rotationally connected to said lever assembly (11).

In accordance with a further embodiment, said lever assembly (11) comprises a lever slot (35) within which a guide rotation pin (36) integral with said sliding guide (13) is guided, for example realizing a yoke coupling, allowing a translation of said sliding guide (13) with respect to said extensible strut assembly (7).

In accordance with a further embodiment, said sliding guide (13) comprises two tines (37, 38) arranged straddling said toothed ring (10).

One tine (38) is arranged, either directly or indirectly, in contact between said toothed ring (10) and said support (9).

Said tine (38) comprises opposite tine abutting surfaces (39, 40), which are sandwiched between said support abutting surface (18) and said ring abutting surface (21) when the braking force (Ff) is greater than a predetermined threshold force (Fs).

In accordance with a further embodiment, a washer (41) and/or a plate (42) is interposed between said opposite tine abutting surfaces (39, 40) and said support abutting surface (18) and said ring abutting surface (21).

In accordance with a further embodiment, elastic shoe return elements (43) are provided between said two shoes (2, 3), thus sandwiching said extensible strut assembly (7) between said shoes (2, 3), applying a minimum clamping action on said sliding guide (13), without however preventing the sliding thereof with respect to the extensible strut assembly (7) where the force is lower than the predetermined threshold action (Fs).

In accordance with a further embodiment, lever return elastic elements (44) are provided between said lever assembly (11) and said shoe (3) which constantly return said lever assembly (11) into permanent contact with said shoe (3).

In accordance with a further embodiment, a containing body (45) accommodates at least in part said lever assembly (11) and said support (9) and supports said lever pin (12).

For example, said containing body comprises a sheared and folded sheet metal body forming at least the seats for the lever pin (12) and the seats for the support (9).

In accordance with a further embodiment, said ratchet mechanism (14) rotationally actuates said toothed ring (10) during the actuation of the brake, when the brake force (Ff) is lower than a predetermined threshold force (Fs).

In accordance with a further embodiment, said ratchet mechanism (14) rotationally actuates said toothed ring (10) during the return to resting position of said lever assembly (11).

The operation of the device is described below.

STEP X

Figure 17:
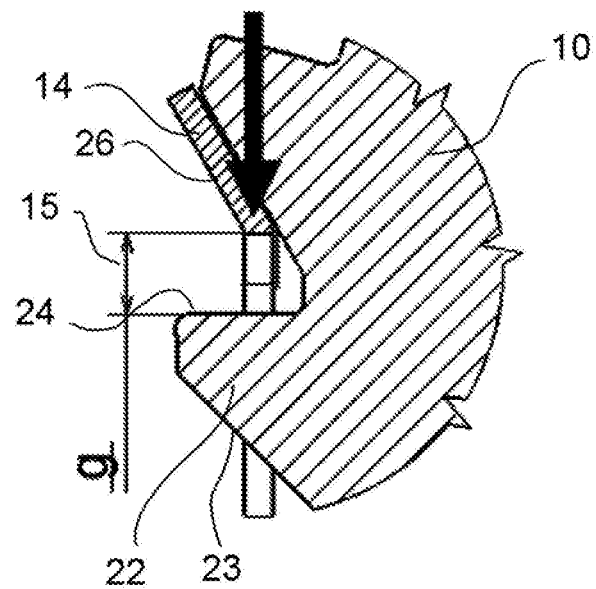
FIG. 17 shows in section a detail of the coupling between the ratchet mechanism and the toothed ring, highlighting the idle stroke which ensures the minimum operating clearance of the parking brake.
Figure 19:
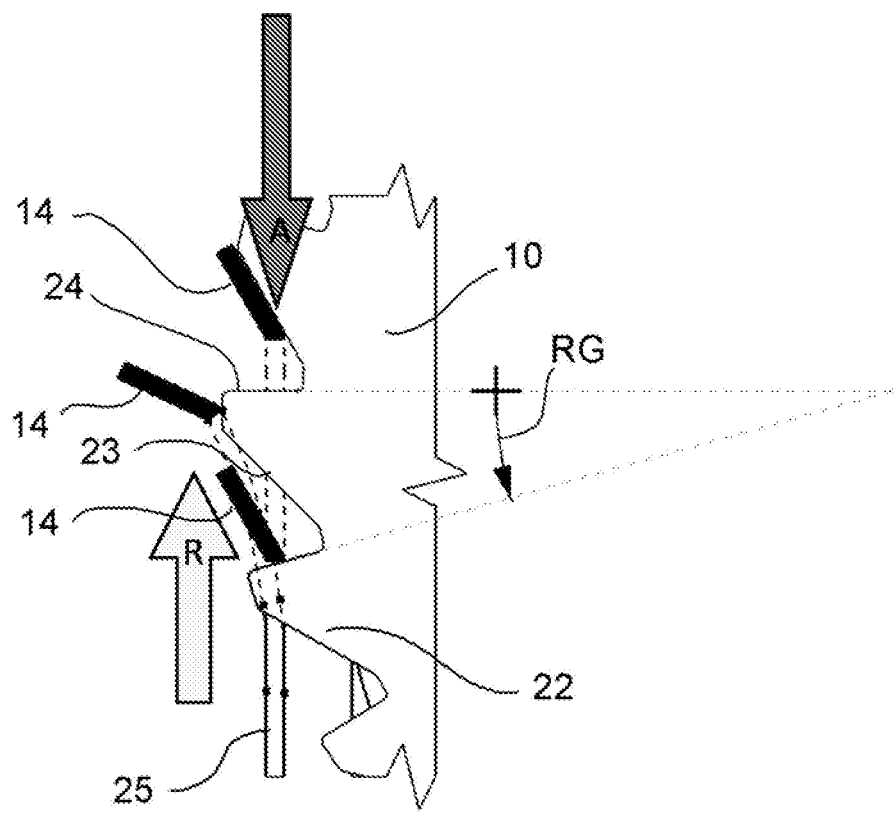
FIG. 19 shows a detail of the coupling between the ratchet mechanism and the toothed ring which highlights the return step of the ratchet mechanism.
Figure 20:
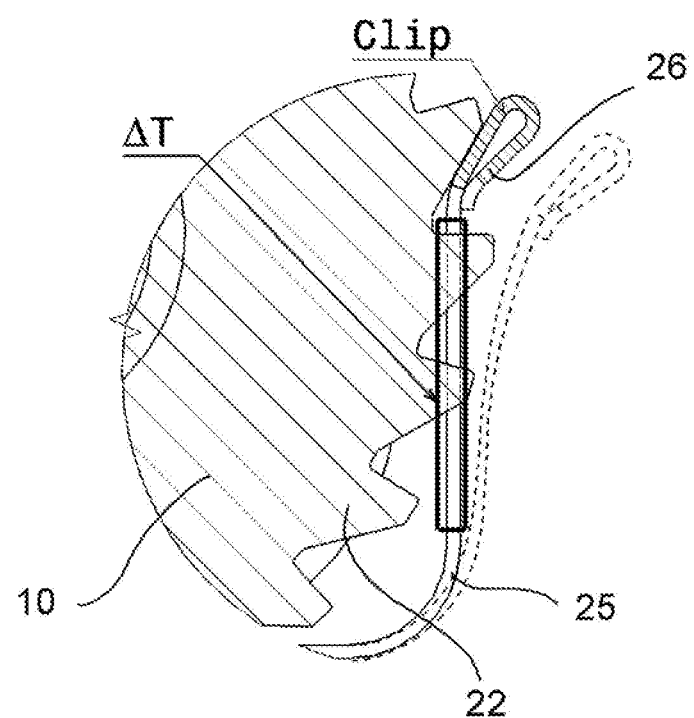
FIG. 20 shows a detail, partially in section and in two operating conditions, of the ratchet mechanism or clip, of the coupling between the ratchet mechanism or clip and the toothed ring which, according to a further embodiment, highlights a portion of the clip deforming with the change of temperature, thus moving the clip away from the toothed ring.

Following the movement of the shoes, caused by the braking force Fr, the shoe 3 rotates with respect to the support point of the lever assembly 11. Such rotation is applied to the lever assembly 11, in particular, the first bar 27, by means of the contact of an end portion of the shoe on said first bar 27, rotating in turn the lever assembly with respect to the lever pin 12, and translating the sliding guide 13 and the ratchet mechanism clip 14 integral therewith (FIGS. 17 and 19).

The clip 14 performs a first "idle" segment 15, recovering the operating clearance between the shoe 2, 3 and the drum 5, necessary to ensure the free rotation of the drum 5 itself with respect to the shoes 2, 3. In this segment, the distance between the shoes is unchanged. If, from this position, the braking force Ff is released, the system returns to the initial position without the distance between the shoes changing.

Once the initial gap 15 (functional clearance) is recovered, two conditions may occur:

STEP Y—Block condition
STEP Z—Recovery condition

STEP Y—Operating in block condition, is described below

The condition is described below whereby the gap between the shoes 2, 3 and the drum 5, i.e. the bell of the DIH disc, is, as in the previous case, in a condition whereby the recovery from a wear is not necessary (unworn shoes/bell), but the stroke due to the actuation of the force Ff increases as a result of the deformations of the system due to the application of the braking force Ff by the actuation device 6.

Figure 16:
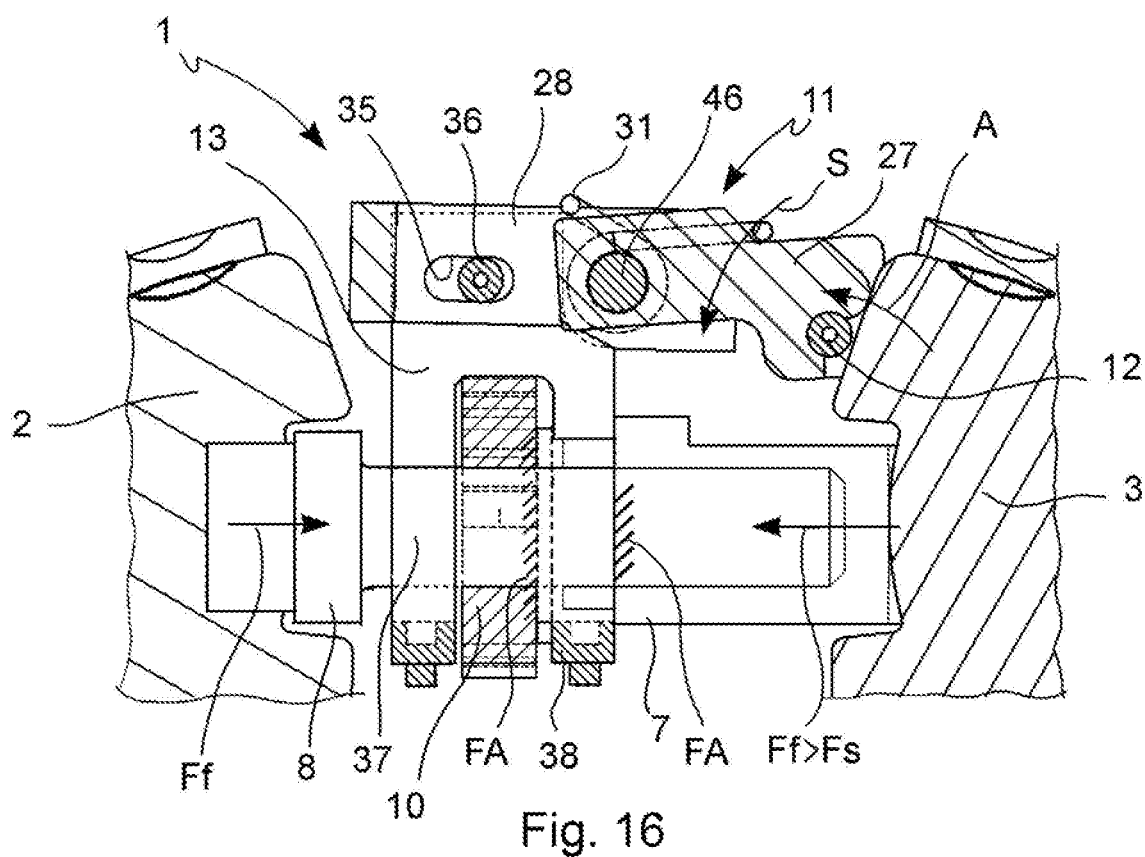
FIG. 16 shows a section of the device of FIG. 6 in an operating condition, in which the braking force is greater than a predetermined threshold action and blocks the sliding of the sliding guide between the support and the toothed ring, preventing the rotation of the toothed ring and making the lever assembly rotate.
Figure 18:
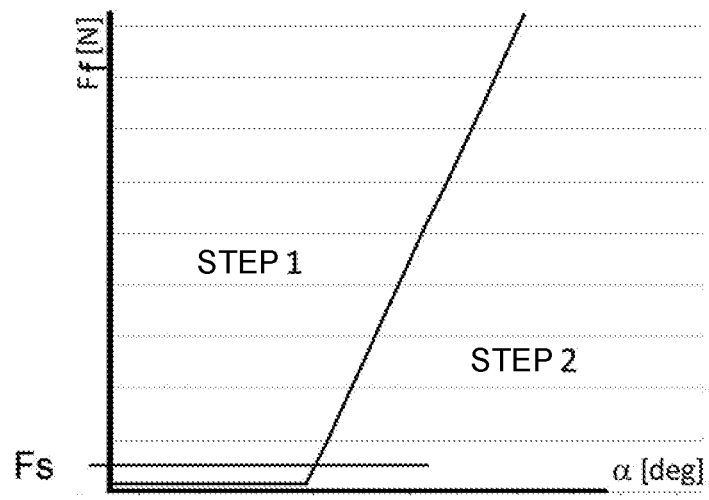
FIG. 18 shows, in a Cartesian plane, the rotation of the shoe and the braking force, in particular the force applied by the shoes on the extensible strut assembly, showing two different operating steps.

The rotation of the shoe 3 may be divided into two different steps; an initial rotation (with respect to the support point "A" of the lever assembly 11) due to the recovery of the functional clearance 15 (Step 1 in FIG. 18), and a subsequent one (again with respect to "A") due to the compression of the friction material on the disc bell and to the deformation of the stressed components (Step 2 in FIG. 18). The compression force of the two shoes 2, 3 remains almost constant in the first step and undergoes a rapid increase in the second one due to the rigidity of the system. Following the increase of the compression forces (step 2 in FIG. 18), the relative friction force on the sliding planes or opposite tine surfaces 39, 40 of the sliding guide 13 also increases, preventing the translation thereof (FIG. 16). Consequently, the rotation of the toothed ring 10 and therefore the increase in the distance between the shoes 2, 3 are inhibited.

Since the translation of the sliding guide 13 is blocked, but the increase of the rotation of the shoe 3 continues as a result of the load increase step (step 2 of FIG. 18), the lever assembly, composed of two separate parts (first and second bar 27, 28 or a single lever bar 32 with an elastic lever portion 33) mutually biased by the elastic lever elements 31, yields thus absorbing the relative rotation between the two bars (FIG. 16). In particular, the bars 27, 28 rotate therebetween only when the sliding guide 13 is blocked by friction.

In the return step, at the end of the brake force Ff, the device returns to the initial configuration, by virtue of the action of the lever return elastic elements 44 and of the elastic lever elements 31.

STEP Z—Operating in recovery condition

The condition is described below whereby the gap between the shoe 2, 3 and the drum 5, the bell of the DIH disc, is in a condition whereby the recovery from a wear is necessary (advanced wear status).

The wear causes the shoe/bell clearance to increase beyond the functional amount (functional clearance and idle stroke 15), therefore allowing the shoes 2, 3 to exceed STEP X, and continuing the rotation with respect to the point "A" (without the load on the device rising in magnitude). Until the moment in which the shoes come in contact with the bell, the braking force Ff, and therefore the friction forces on the opposite tine surfaces 39, 40, do not undergo significant increases, thus allowing the sliding guide 13 to move as in STEP X.

The clip 14, integral with the sliding guide 13, translates until touching the toothed ring 10, then rotating it (arrow A in FIG. 19). The piston 8, blocked in rotation on the rib of the shoe 2, unscrews from the toothed ring 10, thus increasing the distance between the shoes 2, 3.

The action continues until the shoes 2, 3 meet the bell, thus producing the situation described in STEP Y.

During the return step (arrow R in FIG. 19) the clip 14 slides on the tooth 22 adjacent to the one just pushed of the ring 10, deforming outwardly and then returning to the initial configuration (undeformed), thus bypassing the tooth 22.

In the following application, by virtue of the action described in STEP Z, the correct functional clearance 15 is restored as in STEP X.

Those skilled in the art, in order to satisfy contingent needs, may modify and adapt the embodiments of the assembly described above, and replace elements with other functionally equivalent, without departing from the scope of the following claims. Each of the features described as belonging to a possible embodiment may be achieved independently from the other embodiments described.

A method for adjusting the clearance between the shoes 2, 3 and the drum 5 is described below.

A method for adjusting the clearance between the shoes 2, 3 and a drum 5 of a parking brake, comprises the steps of:
  providing a device according to any one of the embodiments described above;
  applying a braking force Ff of lower magnitude than a predetermined threshold force Fs on the shoes 2, 3 and rotating the shoes 2, 3;
  rotating the lever assembly 11;
  making the sliding guide 13 and the ratchet mechanism slide, thus recovering the idle stroke 15;
  if the braking force Ff continues to remain lower than the predetermined threshold force Fs, engaging the ratchet mechanism in the toothed ring 10 and rotating the ring extending the extensible strut 7;
  or
  if the braking force Ff exceeds the predetermined threshold force Fs, blocking the sliding guide 13, thus preventing the rotation of the toothed ring 10 and avoiding to increase the distance between the shoes 2, 3.

LIST OF REFERENCES

1 device for adjusting the clearance of a drum brake
2 shoe
3 shoe
4 braking surface
5 drum
6 actuation device
7 extensible strut assembly
8 piston
9 support
10 toothed ring
11 lever assembly
12 lever pin
13 sliding guide
14 ratchet mechanism
15 idle stroke
16 piston stem
17 support housing
18 support abutting surface
19 ring body
20 ring threaded hole
21 ring abutting surface
22 ring teeth
23 slide-shaped tooth side
24 coupling tooth side
25 elastic clip body
26 clip end
27 first bar
28 second bar
29 first bar abutting surface
30 second bar abutting surface
31 elastic lever elements
32 single lever bar
33 elastic lever portion
34 torsional return spring
35 lever slot
36 guide rotation pin
37 tine
38 tine between ring and support
39 opposite tine abutting surfaces
40 opposite tine abutting surfaces
41 washer
42 plate
43 elastic shoe return elements
44 lever return elastic element
45 containing body
46 first and second bar rotation pin
X-X resting direction of the lever assembly
A-A axial direction
R-R radial direction
T-T tangential direction
S first bar rotation
A shoe rotation
RG toothed ring rotation
Fr Resisting action of the extensible strut
Ff Braking action
Fs Predetermined threshold braking action
FA Friction and blocking action of the toothed ring

The invention claimed is:

1. A device for adjusting the clearance of a drum brake arranged between a first shoe and a second shoe which cooperate with a braking surface of a drum, said first shoe and said second shoe are moved by an actuation device which stresses them from a resting position, in which said first shoe and said second shoe are away from said braking surface at least by a minimum operating clearance, to a braking position, in which said first shoe and said second shoe abut against said braking surface, wherein:
  said clearance adjustment device comprises an extensible strut assembly arranged between said first shoe and said second shoe, which creates a reaction action on said first shoe and said second shoe when stressed by a braking action applied by the actuation device;
  said extensible strut assembly comprising:
    a piston rotationally constrained to said first shoe;
    a support rotationally constrained to said second shoe and slidingly connected to said piston making the extensible strut assembly extensible to adjust the distance of said first and second shoe;
    a toothed ring rotational with respect to said piston and abutting against said support, by rotating said toothed ring applies an action on said piston and on said support thus extending said extensible strut assembly and moving away said first shoe and said second shoe;
  and wherein said clearance adjustment device further comprises:
    a lever assembly having a first lever end arranged in contact with said second shoe and biased in rotation by said second shoe when said second shoe is stressed by said actuation device;
    said lever assembly rotating about a lever pin;
  and wherein said clearance adjustment device further comprises:
    a sliding guide rotationally connected to said lever assembly, the sliding guide comprising at least one sliding guide portion inserted in the extensible strut assembly directly or indirectly in contact between the support and the toothed ring making a coupling of said sliding guide and said extensible strut assembly;
    said sliding guide sliding with respect to said extensible strut assembly during the rotation of said lever assembly; and wherein
    said sliding guide comprises a ratchet mechanism which acts on said toothed ring so as to turn said toothed ring when said sliding guide slides with respect to said extensible strut assembly and when it exceeds a predetermined idle stroke thereof of said ratchet mechanism with respect to said toothed ring; and wherein
    said coupling of said sliding guide and said extensible strut assembly makes the sliding of said sliding guide possible when the reaction action, equal and contrary to the braking action, is lower than a predetermined threshold, thus allowing the ratchet mechanism to run said idle stroke and possibly actuate said toothed ring extending said extensible strut assembly; and wherein said coupling of said sliding guide and said extensible strut assembly prevents the sliding of said sliding guide when the reaction action, equal and contrary to the braking action, is higher than a predetermined threshold, thus preventing the ratchet mechanism, when said threshold is reached, from actuating said toothed ring and preventing the extension of said extensible strut assembly.

2. The clearance adjustment device, according to claim 1, wherein said piston comprises an externally threaded piston stem; and wherein said support comprises a support housing which slidingly accommodates said piston stem.

3. The clearance adjustment device, according to claim 1, wherein said support comprises a support abutting surface.

4. The clearance adjustment device, according to claim 2, wherein said toothed ring comprises a ring body having a threaded hole screwed to said threaded piston stem.

5. The clearance adjustment device, according to claim 1, wherein said threaded ring comprises a ring abutting surface adapted to cooperate, either directly or indirectly, with said support abutting surface.

6. The clearance adjustment device, according to claim 1, wherein said ratchet mechanism is a one-way ratchet mechanism which cooperates with the toothed ring comprising ring teeth shaped with a slide-shaped tooth side, which allows the ratchet mechanism to climb over the tooth on which the ratchet mechanism acts, and with a coupling tooth side, which makes the coupling of the ratchet mechanism and the rotation of the toothed ring possible.

7. The clearance adjustment device, according to claim 1, wherein said ratchet mechanism comprises an elastic clip body;

said body is connected to said sliding guide so as to allow one ratchet-shaped clip end to couple with a tooth of said toothed ring, in its movement when it must rotate said ring nut, and climb over said tooth being elastically deformed, in its movement opposite to the previous one; and/or wherein said body is connected to said lever assembly.

8. The clearance adjustment device, according to claim 1, wherein said lever assembly comprises a first bar rotationally connected to said lever pin; and wherein said lever assembly comprises a second bar rotationally connected with respect to said first bar; and wherein said first bar comprises a first bar abutting surface; and said second bar comprises a second bar abutting surface; and wherein said lever assembly comprises elastic lever elements which constantly bias said first bar abutting surface to abut against said second bar abutting surface taking, when it is not stressed, said lever assembly to resting position and returning said lever assembly to this resting position at least when the braking action ceases, said elastic lever elements allowing the relative rotation of said second bar with respect to said first bar, at least when the braking action is greater than said predetermined threshold, thus avoiding the sliding of said sliding guide.

9. The clearance adjustment device, according to claim 1, wherein said lever assembly comprises a single lever bar, said single lever bar comprising an elastic lever portion which allows the bending of the lever assembly when the braking force is greater than said predetermined threshold, thus avoiding the sliding of the sliding guide; and/or wherein a torsional return spring is provided between said lever assembly and said single lever bar.

10. The clearance adjustment device, according to claim 1, wherein said sliding guide is rotationally connected to said lever assembly; and wherein said lever assembly comprises a lever slot within which a guide rotation pin integral with said sliding guide is guided.

11. The clearance adjustment device, according to claim 1, wherein said sliding guide comprises two tines arranged straddling said toothed ring; and wherein at least one tine is arranged, either directly or indirectly, in contact between said toothed ring and said support; and wherein said at least one tine comprises opposite tine abutting surfaces, which are sandwiched between said support abutting surface and said ring abutting surface when the braking force is greater than a predetermined threshold force; and/or wherein a washer and/or a plate is interposed between said opposite tine abutting surfaces and said support abutting surface and said ring abutting surface.

12. The clearance adjustment device, according to claim 1, wherein elastic shoe return elements are provided between said first shoe and said second shoe, thus sandwiching said extensible strut assembly.

13. The clearance adjustment device, according to claim 1, wherein lever return elastic elements are provided between said lever assembly and said second shoe which constantly return said lever assembly into permanent contact with said second shoe.

14. The clearance adjustment device, according to claim 1, wherein a containing body accommodates at least in part said lever assembly and said support and supports said lever pin.

15. The clearance adjustment device, according to claim 1, wherein said ratchet mechanism rotationally actuates said toothed ring during the actuation of the brake, when the brake force is lower than a predetermined threshold force.

16. The clearance adjustment device, according to any claim 1, wherein said ratchet mechanism rotationally actuates said toothed ring during the return to resting position of said lever assembly.

17. A method for adjusting a clearance between the first shoe and the second shoe of a drum brake, comprising the steps of:

providing a device for adjusting the clearance between the drum brake and the first shoe and the second shoe according to claim 1, applying a braking force of lower magnitude than a predetermined threshold force on said first shoe and said second shoe and rotating said first shoe and said second shoe;

rotating the lever assembly;

making the sliding guide and the ratchet mechanism slide, thus recovering the idle stroke;

alternatively if the braking force continues remaining lower than the predetermined force threshold, engaging the ratchet mechanism in the toothed ring and rotating the ring extending the extensible strut assembly;
or
if the braking force exceeds the predetermined threshold force, blocking the sliding guide, thus preventing the rotation of the toothed ring and avoiding increasing the distance between said first shoe and said second shoe.

\* \* \* \* \*